United States Patent [19]

Snavely, Jr. et al.

[11] 3,880,237
[45] Apr. 29, 1975

[54] PREVENTION OF SCALE IN PETROLEUM PRODUCTION BY ALKALINE FLOODS

[75] Inventors: Earl S. Snavely, Jr., Arlington, Tex.; Theodore A. Bertness, Whittier, Calif.

[73] Assignee: Mobil Oil Corporation, New York City, N.Y.

[22] Filed: May 6, 1974

[21] Appl. No.: 467,041

Related U.S. Application Data

[63] Continuation-in-part of Ser. No. 326,929, Jan. 26, 1973, Pat. No. 3,844,349.

[52] U.S. Cl. ............... 166/303; 166/271; 166/272; 166/266; 423/242
[51] Int. Cl. ..................... E21b 43/24; E21b 43/27
[58] Field of Search .......... 166/271, 272, 270, 303, 166/266, 267, 273, 274, 307; 423/242; 55/73

[56] References Cited
UNITED STATES PATENTS

| | | | |
|---|---|---|---|
| 2,073,039 | 3/1937 | Wilton et al. | 423/242 |
| 2,113,198 | 4/1938 | Nonhebel et al. | 423/242 |
| 2,813,583 | 11/1957 | Marx et al. | 166/272 X |
| 3,193,009 | 7/1965 | Wallace et al. | 166/263 X |
| 3,279,538 | 10/1966 | Doscher | 166/272 X |
| 3,353,597 | 11/1967 | Mulder | 166/274 X |
| 3,632,306 | 1/1972 | Villiers-Fisher | 423/242 X |
| 3,644,087 | 2/1972 | Urban | 423/242 |
| 3,687,613 | 8/1972 | Rickard | 55/73 X |

*Primary Examiner*—Stephen J. Novosad
*Attorney, Agent, or Firm*—C. A. Huggett; Henry L. Ehrlich

[57] ABSTRACT

This specification discloses a method of producing petroleum from a petroleum-bearing formation wherein a caustic water is injected via a well means into the formation. There is provided a water that has bicarbonate ions therein and the water is treated with sulfur dioxide to reduce the bicarbonate ion concentration of the water and thereby prevent or greatly reduce the formation of scale upon the addition of a base or caustic to the water. Thereafter a caustic is added to the treated water and the caustic water is injected into a petroleum-bearing formation and petroleum is produced therefrom.

9 Claims, 1 Drawing Figure

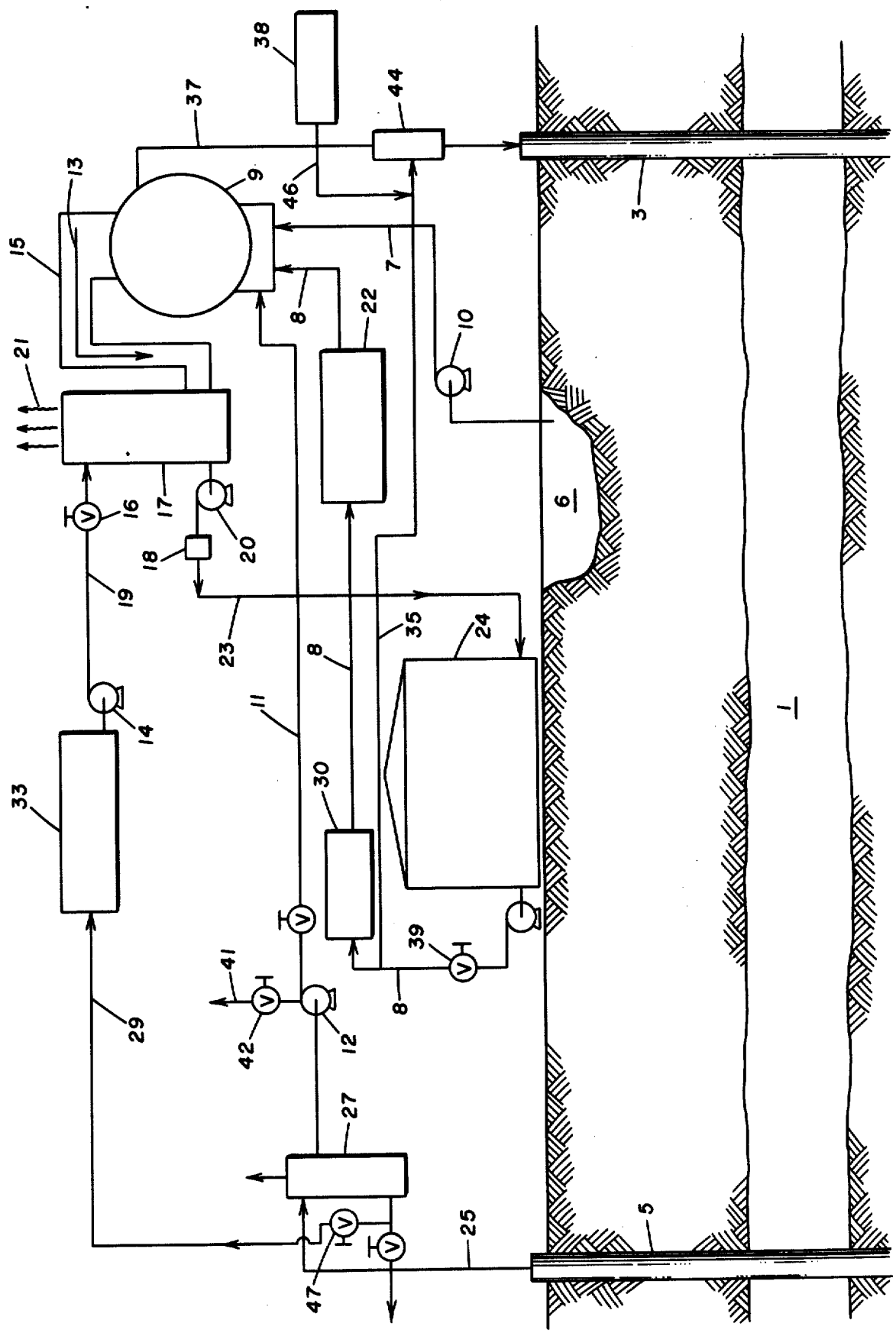

3,880,237

PREVENTION OF SCALE IN PETROLEUM PRODUCTION BY ALKALINE FLOODS

CROSS REFERENCE TO RELATED APPLICATION

This is a continuation-in-part of application Ser. No. 326,929, filed Jan. 26, 1973, and now U.S. Pat. No. 3,844,349.

BACKGROUND OF THE INVENTION

This invention is directed to a method of producing petroleum from the petroleum-bearing formation. More particularly, this invention is directed to a method of producing petroleum from a petroleum-bearing formation wherein there is injected into the formation a caustic fluid. Still more particularly, this invention is directed to a method of mitigating the formation of scale in carrying out a method of producing petroleum from a petroleum-bearing formation by injecting a caustic fluid into the formation and wherein a water containing bicarbonate ions is used for forming the caustic water.

In the production of heated fluid for use in a heated fluid stimulation oil recovery method, water is injected into a heated fluid generator as feed water and fuel is burned to supply heat to heat the water. Sufficient fuel, such as gas or oil, may be burned in the heated fluid generator to convert the water injected thereinto into steam. The heated fluid is then injected via an injection well into a producing formation.

In the burning of a fuel in a heated fluid generator, a flue gas is produced which has in the past normally been vented to the atmosphere. However, in the burning of a sulfur-containing fuel, the flue gas contains sulfur oxides which desirably should not be vented to the atmosphere.

In an article published in CHEMICAL WEEK, Sept. 2, 1970, entitled "Smokestack Oxides May Get Sea-Water Scrubbing", there is described a process that uses sea water to scrub sulfur oxides from power plant smokestack gases. In accordance with this process, sea water is contacted with gases containing sulfur dioxide and the sulfur dioxide is removed therefrom. An earlier reference that is directed to removing sulfur dioxide from flue gases is U.S. Pat. No. 1,271,899 to Henry Howard et al. Howard et al. described a process wherein furnace gases are first treated to remove dust and sulfur trioxide therefrom. The partially purified gas mixture is then brought into contact in a scrubbing tower with a dilute solution of alkali which effectively removes the greater part of the sulfur dioxide and yields a harmless exit gas and a dilute solution of sodium sulfite.

It has previously been taught to use alkaline or caustic waters for flooding petroleum-bearing reservoirs to improve the recovery of petroleum therefrom. In U.S. Pat. No. 1,651,311 there is described a method for recovering oil from an oil-bearing formation by injecting a strong alkali, preferably in a saturated aqueous solution, into the formation. In U.S. Pat. No. 2,288,857 there is disclosed a technique for recovering petroleum from a subsurface formation by injecting into the formation an aqueous solution which aids in stripping the petroleum from the formation and depressing the interfacial tension between the petroleum and the water and which effects emulsification of the petroleum. The emulsifying agent may be formed by a reaction between the components present in the petroleum and in the aqueous solution. Thus, when using aqueous solutions containing caustic alkali, such as sodium and potassium hydroxides or ammonium hydroxide or alkali salts, an emulsifying soap may be formed by the reaction between the alkali and the organic acids naturally present in the petroleum. It was recognized in U.S. Pat. No 1,238,355 that the displacement of oil by water from an oil-bearing sand may be made more complete by introducing an alkali into the water and by raising the temperature of the water.

In U.S. Pat. No. 2,813,583 there is described a process for recovering hydrocarbon material from a formation wherein a water soluble alkalizing agent is incorporated into a hot water and/or steam that is injected into the formation to raise the pH of the treating aqueous medium to above 7.5. Ammonia is described as a preferred agent in vapor phase injection, and water-soluble compounds of an alkaline nature are noted as effective in liquid phase injection. Such alkaline compounds include the alkali metal compounds such as the hydroxides, carbonates, silicates, etc., as well as ammonium hydroxide. The sodium compounds are indicated to be preferred.

In U.S. Pat. No. 2,882,973 there is described a method of recovering oil from bituminous or tar sands by subjecting the bituminous sands to the action of an aqueous solution containing a non-ionic surface-active agent, which solution has a pH of at least 12. To provide the pH of at least 12 of the surfactant-containing aqueous liquid, a base is incorporated into either a fresh or saline water. The treating solutions into which the non-ionic surfactants are incorporated preferably are comprised of fresh or saline waters containing ammonia or an alkali metal hydroxide, preferably sodium hydroxide, to yield a solution having a pH of at least 12. Normally this is obtained by the incorporation of sodium hydroxide in amounts equal to about 0.5 percent by weight. The temperature of the treating solution may vary within wide limits and no special heating thereof is necessary. Excellent results can be obtained by using the described aqueous alkaline solutions at temperatures in the range of from about 15°C. to about 40°C., although it is noted that sometimes higher temperatures may be advantageous because a rise in temperature generally enhances the activity of the surfactant and thus increases the speed of emulsification.

In U.S. Pat. No. 3,221,813 there is described a process of recovering petroleum tars from an incompetent petroleum tar sand reservior. An injection and a production well are completed into the formation and a fracture is extended through the formation and into communication with the production and injection wells. A hot gas, preferably steam, is pumped into the fracture. The hot gas may contain components that enhance their tendency to entrain petroleum materials, such as ammonia or amines, etc., in their gas phase and/or ammonium or alkali metal bases in their liquid phases. When the pressure required to force the fluid through the fracture closely approaches the fracturing pressure, the pumping of the hot gas is terminated and a vapor-free liquid capable of entraining viscous petroleum materials is pumped into the fracture through the injection well to remove the viscous petroleum materials that have accumulated in the fracture. Entraining liquids capable of emulsifying petroleum may take various forms, such as aqueous caustic, e.g., NaOH or KOH, or aqueous sodium, potassium, ammonium, carbonates, borates, or the like salts of strong bases and weak acids, which may contain surface active materials as dissolved or dispersed components of the liquids.

SUMMARY OF THE INVENTION

This invention is directed to a method of producing petroleum from a petroleum-bearing formation that is penetrated by a well means and wherein a caustic water is injected into the formation and petroleum is produced therefrom. There is provided a water that has bicarbonate ions, and this water is treated with sulfur dioxide to reduce the bicarbonate ion concentration thereof. A caustic is added to the treated water to form the caustic water and the caustic water is injected into the formation and petroleum is produced therefrom. In an embodiment, the water having bicarbonate ions is treated by passing a sulfur dioxide gas through a contactor vessel and passing the water having bicarbonate ions through the contactor vessel in counterflow with the sulfur dioxide gas to reduce the concentration of the bicarbonate ions by substituting sulfate ions for the bicarbonate ions. The water of reduced bicarbonate ion concentration is discharged from the contactor vessel and caustic is then added to the treated water.

In accordance with another embodiment, a hot caustic fluid is injected into the petroleum-bearing formation. The hot fluid is generated by injecting feed water into a hot fluid generator and firing the hot fluid generator with a sulfur-containing fuel. The hot fluid generator emits a flue gas which contains sulfur oxides and flue gas containing sulfur oxides is passed through a contactor vessel. A water having bicarbonate ions is passed through the contactor vessel in counterflow with the flue gas to reduce the concentration of the bicarbonate ions by substituting sulfate ions for the bicarbonate ions. The flue gas and the water of reduced alkalinity and bicarbonate ion concentration are discharged from the contactor vessel and at least a portion of the discharged water of reduced alkalinity and bicarbonate ion concentration is injected into the hot fluid generator as feed water. A caustic is added to the hot fluid that is generated by the hot fluid generator to form a hot caustic fluid and the hot caustic fluid is injected into the petroleum-bearing formation and petroleum is produced therefrom.

BRIEF DESCRIPTION OF THE DRAWING

The drawing is a schematic flow diagram illustrating the method of the invention.

DESCRIPTION OF THE PREFERRED EMBODIMENTS

This invention is directed to a method of producing petroleum from a petroleum-bearing formation by injecting a caustic fluid into the formation and, more particularly, to preventing or reducing the formation of scale when a water containing bicarbonate ions is used for forming the caustic water.

In accordance with this invention, a water containing bicarbonate ions is provided for injecting into the petroleum-bearing formation and is treated with sulfur dioxide to reduce the bicarbonate ion concentration thereof. A caustic is then added to the treated water to form a caustic water and the caustic water is injected into the petroleum-bearing formation. A source of water having bicarbonate ions for injecting into the petroleum-bearing formation is commonly a subterranean formation. Many times such waters are alkaline and are produced from the petroleum-bearing formation along with petroleum.

In accordance with the embodiment, the water having bicarbonate ions is treated by passing a sulfur dioxide gas through a contactor vessel and passing the water having bicarbonate ions through the contactor vessel in counterflow with the sulfur dioxide gas to reduce the concentration of the bicarbonate ions by substituting sulfate ions for the bicarbonate ions and discharging the water of reduced bicarbonate ion concentration from the contactor vessel. A flue gas which contains sulfur oxides is an economical source of a sulfur dioxide gas. Such a flue gas may be generated by burning a sulfur-containing fuel in a flue gas generator. The flue gas generator may be a heated fluid generator as described below with regard to a further embodiment of this invention. A caustic is added to the treated water and the caustic water is injected into the petroleum-bearing formation. Desirably the caustic is added to the treated water in an amount sufficient to provide a pH value of the caustic water of at least 11.5. By use of the term "caustic" is meant a base. A particularly desirable caustic for use in carrying out this invention is sodium hydroxide, although other caustics may be used such as, for example, potassium hydroxide, calcium hydroxide, ammonium hydroxide, and ammomia. This invention is applicable to the use of either heated or unheated caustic fluids. However, particularly in the recovery of highly viscous petroleums, the use of heated caustic fluids is preferred. For simplicity of description, this invention is hereafter described with reference to injecting a hot caustic fluid into a petroleum-bearing formation but it is to be understood that this invention is also applicable to injecting an unheated cautic fluid into a petroleum-bearing formation.

In accordance with an embodiment of this invention, there is provided a method of producing petroleum from a petroleum-bearing formation by injecting a heated or hot caustic fluid into the formation. A hot fluid is generated by firing a heated fluid generator with a sulfur-containing fuel and thereby emitting a flue gas containing sulfur oxides and using the flue gas to treat a water having bicarbonate ions to remove or greatly reduce the bicarbonate ion concentration of the water. The treated water is heated by the heated fluid generator to provide a hot fluid and a caustic is added to the hot fluid and the hot caustic fluid is injected into the formation.

A hot fluid that is commonly employed is steam of about 80 percent quality, though steam of any quality may be employed. Other hot fluids may also be employed, and hot water is preferred fluid for some applications. The water may be heated directly by the heat generated in firing the heated fluid generator or, if desired, by using high temperature steam generated by the heated fluid generator to heat large volumes of water. As an example, the high temperature steam may be generated and mixed with water to heat the water to a desired temperature, e.g., about 350°F., after which the heated water having the caustic added thereto is injected into the formation. For simplicity in describing this invention, hereafter when reference is made to steam it is to be understood to encompass other heated fluids and in particular heated water. Likewise, when reference is made to a steam generator, it is to be understood to encompass other heated fluid generators.

With reference to the drawing there is shown a petroleum-bearing formation 1 penetrated by a well means here illustrated as an injection well 3 and a production well 5 although the well means may take the form of a single well or a plurality of wells. Water from a water source 6 is pumped by pump 10 through line 7 and into a steam generator 9 as generator feed water. A sulfur-containing fuel is fired in the steam generator to convert the feed water into steam. The sulfur-containing fuel may be, for example, pumped by pump 12 through line 11 and into the steam generator 9 where it is burned to heat the feed water and generate steam. The burning of the sulfur-containing fuel in steam generator 9 produces a flue gas 13 which contains sulfur oxides and, in particular, sulfur dioxide ($SO_2$). The flue gas 13 is flowed through a conduit 15 and into a contactor vessel 17. An alkaline water containing bicarbonate ions is pumped by pump 14 through line 19 and into the contactor vessel 17. The pump 14 may be a variable speed pump, and line 19 may be provided with a valve 16 whereby the rate of flow of the alkaline water containing bicarbonate ions into the contactor vessel 17 may be controlled. The flue gas 13 containing sulfur oxides and the alkaline water containing bicarbonate ions are flowed through the contactor vessel 17 in counterflow one with the other and the sulfur oxides combine with the bicarbonate ions to form sulfate ions, and the sulfur oxides are removed or scrubbed from the flue gas. The scrubbed flue gas 21 is discharged from the contactor vessel 17 and may be vented to the atmosphere. The alkaline water in passing through the contactor vessel 17 in counterflow with the flue gas 13 is reduced in alkalinity. It is desirable to maintain the pH of the water of reduced alkalinity exiting from the contactor vessel 17 via line 23 at a predetermined value. The pH of the water exiting from the contactor vessel 17 may be determined, for example, by pH meter 18 provided in communication with line 23. The pH of the alkaline water flowing through the contactor vessel and exiting therefrom may be controlled by controlling the flow rate of the alkaline water through the emission scrubber vessel, for example, the slower the flow rate the lower the pH of the alkaline water exiting from the contactor vessel. This flow rate may be controlled, for example, by controlling the variable speed pump 14 or the valve 16 in line 19 leading to the contactor vessel. Also there may be provided in line 23 leading from the contactor vessel a pump 20 which may be a variable speed pump and a valve (not shown), either of which may be used to control the flow rate of the alkaline water from the contactor vessel. Alkalis may also be added if needed to increase the pH. The water of reduced alkalinity that is discharge from the contactor vessel 17 through line 23 may be recirculated (not shown), particularly if the pH is high, through the contactor vessel 17 and then may be collected in the surge tank 24.

The characteristics of the water exiting from the contactor vessel vary with the pH value of the water. For example, the corrosiveness of the water increases greatly at pH values of less than 5. At the same time, the solubility of suspended matter in the water increases with decreasing pH values. In particular, most scales which may be formed, for example in the contactor vessel, lines leading therefrom, and other associated equipment, are soluble in lower pH waters. Therefore it is desirable to maintain the pH of the water exiting from the contactor vessel at a predetermined pH value in order to control the characteristics of the water. When it is desirable to minimize the corrosive characteristics of the water, then a predetermined pH value of at least 5.0 and preferably at least 6.0 is selected; however, when it is desirable to dissolve scale or other foreign matter a predetermined pH value of less than 5 is selected.

This water of reduced alkalinity and of reduced bicarbonate ion concentration is particularly suitable for use as generator feed water due to improved clarity and reduced tendency to form scale that results from the reactions with sulfur oxides in the contactor vessel, and has been found in some areas to be more suitable for this use than available fresh water. Further, the use of this water as feed water reduces the amount of fresh water needed for the steam generator and thereby conserves available fresh water supplies. In accordance with this invention, at least a portion of the water of reduced alkalinity and of reduced bicarbonate ion concentration is flowed from the surge tank 24 via line 8 and valve 39 and into the steam generator 9 as feed water or make-up water, thereby reducing the need for additional feed water from the water source 6. The water flowing from the surge tank 24 may be further treated by passing it through a filter 30 and water softener 22 prior to injecting it into the steam generator 9 as generator feed water. The excess water in surge tank 24 may be flowed via line 35 and into line 37 and thence into injection well 3. This water of reduced alkalinity and reduced bicarbonate ion concentration is particularly suitable because of the reduced bicarbonate ion concentration for use in forming a caustic water for injecting via injection well 3 and into petroleum-bearing formation 1. Thus, a caustic or alkali is injected from a storage 38 via line 46 and into line 35 where it is blended with the water of reduced bicarbonate ion concentration to form a caustic water. The caustic water is then injected via line 37 into the injection well 3 and into the petroleum-bearing formation 1. The caustic or alkali may be injected from the storage 38 directly into line 37 leading from the steam generator 9 and there blended with the steam or heated fluid to form a hot caustic fluid which is thence injected via well 3 and into the petroleum-bearing formation 1. In accordance with another embodiment of forming a hot caustic fluid, steam flowing from the steam generator 9 through line 37 is injected into a blender 44 and there mixed with the water of reduced alkalinity and reduced bicarbonate ion concentration flowing through line 35 along with the caustic flowing through line 46 to form a hot caustic fluid which is then injected via the injection well 3 and into the petroleum-bearing formation 1.

The reactions that take place in the contactor vessel 17 in contacting the flue gas with the aqueous alkaline solution of soluble bicarbonates are as follows:

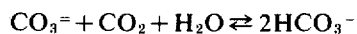

(1)

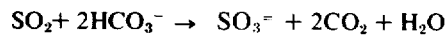

(2)

$$SO_3^= + 1/2 O_2 \rightarrow SO_4^=$$

(3)

Insoluble carbonates, such as calcium carbonates ($CaCO_3$), may be dissolved by contact with carbonated water as follows:

$$CaCO_3 + CO_2 + H_2O \rightarrow Ca^{++} + 2HCO_3^-$$

(4)

Most ground waters and waters produced from earth formations contain calcium ions and bicarbonate ions. These waters when used to form a caustic water for use in a caustic flood must be treated prior to the addition of caustic to avoid scaling problems. For example, if a strong caustic such as sodium hydroxide is added to the untreated water of equation (4), calcium carbonate scale will be formed. This reaction is shown by equation (5):

$$Ca(HCO_3)_2 + 2NaOH \rightarrow CaCO_3 + 2H_2O + Na_2CO_3$$

(5)

If sodium hydroxide is added to a water having a significant concentration of bicarbonate ions, calcium carbonate scale is formed and is very detrimental and may completely clog or very greatly restrict the flow capacity of surface and subsurface flow lines. Waters containing calcium and bicarbonate ions have previously been treated with water softeners to remove the calcium ions before adding caustic thereto.

In accordance with this invention the alkaline waters containing bicarbonate ions are treated with sulfur oxides to reduce the bicarbonate ion concentration. In contacting a water having bicarbonate ions as illustrated by equation (4) with sulfur oxides, and particularly sulfur dioxide, the bicarbonate ions react with the sulfur dioxide to form bisulfate ions as shown by equation (6):

$$Ca(HCO_3)_2 + 2SO_2 + O_2 \rightarrow Ca(HSO_4)_2 + 2CO_2$$

(6)

Caustic may then be added to the treated water without the formation of calcium carbonate scale. The reactions which take place when sodium hydroxides are added to the treated water are shown by equation (7):

$$Ca(HSO_4)_2 + 2NaOH \rightarrow CaSO_4 + Na_2SO_4 + 2H_2O$$

(7)

The caustic solution may then be injected via the associated piping and injection well 3 and into the formation 1.

The function of the contactor vessel is to provide sufficient contact between the sulfur dioxide of the flue gas and the bicarbonate ions of the alkaline water to react the sulfur oxide, and particularly the sulfur dioxide, with the bicarbonate of the water. The size and particular design of the contactor vessel is dependent upon the reaction rate, the alkalinity, and particularly the bicarbonate ion concentration of the water, and the volume of flue gas required to supply sufficient sulfur oxide to react with the bicarbonate ions. The contactor vessel may be designed to employ, for example, Nutter V Slot trays or porcelain saddle packing, to provide the contact between the flue gas and the alkaline water.

By the use of the term "alkaline water" is meant a water which has basic properties, that is, that it will neutralize an acid by reacting the basic components of the water with the acid to form salts. In water analysis, alkalinity represents the carbonates, bicarbonates, hydroxides, and occasionally the borates, silicates, and phosphates in the water.

In a copending application, Ser. No. 326,930, filed Jan. 26, 1973, entitled PROCESS FOR TREATING FLUE GASES TO REDUCE AIR POLLUTION by Theodore A. Bertness and Earl S. Snavely, Jr., there is described a process wherein alkalinity for scrubbing a flue gas is supplied by providing a well means that extends into the earth and penetrates a subsurface formation and by providing alkaline water therefrom. The subsurface formation may contain therein an alkaline water or salts from the group of alkaline earth metals and alkali metals. Where the formation contains alkaline salts, the alkaline water is produced in situ by passing water via the well means into the formation to leach or dissolve the alkaline salts therefrom and form alkaline water which is then produced from the formation via the well means. Soluble alkali salts such as sodium carbonate ($Na_2CO_3$) and potassium carbonate ($K_2CO_3$) are directly soluble in water. Insoluble salts such as calcium carbonate ($CaCO_3$) may be dissolved in a water which contain carbon dioxide dissolved therein.

In accordance with an embodiment of this invention, fluids are produced from the petroleum-bearing formation 1 via the production well 5 which include petroleum having sulfur therein and alkaline water having bicarbonate ions therein. The produced fluids are flowed through line 25 to a separator 27 and there separated. The produced petroleum having sulfur therein may be flowed from separator 27 via pump 12 and line 11 to the steam generator 9 and there burned as fuel, emitting a flue gas 13 having sulfur oxides. The petroleum in excess of that required for firing the steam generator may be flowed via line 41 and valve 42 to a pipeline or storage facility (not shown). The produced alkaline water may be flowed from the separator 27 via line 29, valve 47, clarifier 33, pump 14, and line 19 and into the contactor vessel 17 and there employed for scrubbing the sulfur oxides from the flue gas 13 and converting the bicarbonate ions into bisulfate ions. The treated alkaline water having bisulfate ions exiting from the contactor vessel 17 may be flowed via pump 29 and line 23 to the surge tank 24. A portion of this treated water may be used as feed water for the steam generator. The portion used as feed water for the steam generator is flowed from the surge tank 24 via line 8 to the steam generator. This portion is normally filtered by filter 30 and softened by water softener 22 prior to being injected into the steam generator 9 as feed water. Another portion of the treated water is used for forming a caustic water to be injected into the petroleum-bearing formation 1. This treated water having bisulfate ions is particularly suitable for use as caustic water. It may be passed through the filter 30 if desired to remove foreign particles therefrom, but need not be softened by the water softener 22. The treated water is flowed through line 35 and is mixed with a caustic that is flowed from the caustic storage 38 through line 46 to form a caustic water which is then injected via injection well 3 and into petroleum-bearing formation 1. In accordance with another embodiment, this caustic water is heated. This heating may be done by flowing steam from the steam generator 9 via line 37 into a mixer 44 and flowing the caustic water from line 35 into the mixer 44 to heat the water and form a hot caustic water for injecting via well 3 and then into the petroleum-bearing formation 1.

In accordance with another embodiment, the steam generator 9 is operated to heat a liquid rather than to convert the liquid into steam. The treated water may then be flowed through line 35 and into the steam generator (not shown), by passing the water softener 22, and heateed to the desired temperature. The heated water is then flowed via line 37 to the injection well 3 and caustic is flowed into the heated water (not shown) to mix therewith and form a hot caustic water.

The clarifier 33 may be a depurator vessel through which gas or air as a flotation aid is forced in diffused bubbles through the produced alkaline water to thereby clarify the alkaline water. In the operation of the depurator vessel through which air was passed through the alkaline water on a once-through basis, severe and rapid scaling occurred in the depurator vessel and associated lines. An analysis of this scaling problem indicated that the scaling occured due to the air stripping of the carbon dioxide which was present in the produced water. The scaling problem was overcome by closing the depurator vessel and recycling the air that was used in the flotation process. The depurator vessel was charged initially with carbon dioxide to further aid in overcoming the scaling problem. Charging the depurator vessel with carbon dioxide at atmospheric pressure was found sufficient, though lesser or greater amounts of carbon dioxide could be used to charge the vessel.

We claim:

1. In a method of producing petroleum from a petroleum-bearing formation penetrated by a well means by injectitng a caustic fluid into said formation, the method of treating said fluid to prevent scale deposition comprising:

providing a fluid having bicarbonate ions for injection into said petroleum-bearing formation;
   treating said fluid having bicarbonate ions with sulfur dioxide to reduce the bicarbonate ion concentration of said fluid;
   adding a caustic to said treated fluid to form said caustic fluid;
   injecting said caustic fluid via said well means into said information; and
   producing said petroleum via said well means from said formation.

2. In the method of claim 1, the method of treating said fluid having bicarbonate ions, comprising the further steps of:

passing a sulfur dioxide gas through a contactor vessel;
   passing said fluid having bicarbonate ions through said contactor vessel in counterflow with said sulfur dioxide gas to reduce the bicarbonate ion concentration of said fluid by substituting sulfate ions for said bicarbonate ions; and
   discharging said fluid of reduced bicarbonate ion concentration from said contactor vessel.

3. The method of claim 2 wherein said sulfur dioxide gas is a flue gas containing sulfur oxides.

4. The method of claim 2 wherein said fluid having bicarbonate ions is a produced alkaline water that is recovered from an earth formation.

5. The method of claim 4 wherein said caustic is added to said treated fluid in an amount sufficient to provide a pH value of said caustic fluid of at least about 11.5.

6. A method of producing petroleum from a petroleum-bearing formatioon penetrated by a well means comprising:

a. generating a hot fluid by injecting feed water into a hot fluid generator and firing said hot fluid generator with a sulfur-containing fuel, said hot fluid generator emitting a flue gas containing sulfuur oxides;
   b. passing said flue gas containing sulfur oxides through a contactor vessel;
   c. passing a water having bicarbonate ions through said contactor vessel in counterflow with said flue gas to reduce the concentration of said bicarbonate ions by substituting sulfate ions for said bicarbonate ions;
   d. discharging said flue gas from said contactor vessel;
   e. discharging said water of reduced bicarbonate ion concentration from said contactor vessel;
   f. injecting at least a portion of said discharged water of reduced bicarbonate ion concentration into said hot fluid generator as feed water;
   g. adding a caustic to said hot fluid to form a hot caustic fluid;
   h. injecting said hot caustic fluid via said well means into said petroleum-bearing formation; and
   i. producing petroleum via said well means from said petroleum-bearing formation.

7. The method of claim 6 further comprising adding said caustic to at least another portion of said water of reduced bicarbonate ion concentration and mixing said at least another portion with said hot fluid to form said hot caustic fluid.

8. In a method of producing petroleum from a formation containing petroleum and alkaline water having bicarbonate ions, said formation being penetrated by an injection well and a production well, the steps comprising:

a. generating a flue gas having sulfur oxides by firing a flue gas generator with a sulfur-containing fuel;
   b. producing said alkaline water having bicarbonate ions via said production well from said formation;
   c. clarifying at least a portion of said produced alkaline water containing bicarbonate ions;
   c. passing said clarified alkaline water containing bicarbonate ions through a contactor vessel;
   e. passing said flue gas containing sulfur oxides through said contactor vessel in counterflow with said clarified alkaline water containing bicarbonate ions to reduce the bicarbonate ion concentration of said water;
   f. discharing said flue gas from said contactor vessel;
   g. discharging said water of reduced bicarbonate ion concentration from said contactor vessel;
   h. adding a caustic to said water of reduced bicarbonate ion concentration to form a caustic water;
   i. injecting said caustic water via said injection well into said formation containing petroleum and alkaline water having bicarbonate ions; and
   j. producing petroleum and alkaline water having bicarbonate ions via said production well from said formation.

9. The method of claim 8 wherein said flue gas generator is a hot fluid generator that is fired with a sulfur-containing fuel to generate a hot fluid and wherein said caustic is added to said hot fluid to form a hot caustic fluid.

* * * * *